(12) United States Patent
Sundstrom

(10) Patent No.: US 11,926,550 B2
(45) Date of Patent: Mar. 12, 2024

(54) REMOVAL OF OZONE FROM PROCESS STREAMS WITH ULTRAVIOLET RADIATION

(71) Applicant: Evoqua Water Technologies LLC, Pittsburgh, PA (US)

(72) Inventor: Glen P. Sundstrom, Rockford, IL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 495 days.

(21) Appl. No.: 17/290,246

(22) PCT Filed: Oct. 29, 2019

(86) PCT No.: PCT/US2019/058473
§ 371 (c)(1),
(2) Date: Apr. 29, 2021

(87) PCT Pub. No.: WO2020/092307
PCT Pub. Date: May 7, 2020

(65) Prior Publication Data
US 2021/0403358 A1    Dec. 30, 2021

Related U.S. Application Data

(60) Provisional application No. 62/752,011, filed on Oct. 29, 2018.

(51) Int. Cl.
*B01D 53/02*    (2006.01)
*B01D 19/00*    (2006.01)
(Continued)

(52) U.S. Cl.
CPC ............ *C02F 9/00* (2013.01); *B01D 19/0031* (2013.01); *B01D 19/0063* (2013.01);
(Continued)

(58) Field of Classification Search
CPC ............ B01D 19/0031; B01D 19/0036; B01D 19/0063; B01D 19/0073; C02F 1/20;
(Continued)

(56) References Cited

U.S. PATENT DOCUMENTS 6,464,867 B1 * 10/2002 Morita .................... C01B 13/10
210/765
6,468,434 B2    10/2002 Pappa et al.
(Continued)

FOREIGN PATENT DOCUMENTS

EP    2767517 B1    9/2016
EP    3284728 A1    2/2018
(Continued)

OTHER PUBLICATIONS

Rozanska, Agnieszka, "Extended European Search Report", issued for related European patent application No. 19880569.9, dated Jul. 26, 2022, 43 pages.
(Continued)

*Primary Examiner* — Christopher P Jones

(57) ABSTRACT

A method including directing an aqueous solution having dissolved carbon dioxide and dissolved ozone into a vessel, removing an amount of the dissolved carbon dioxide and irradiating the effluent with ultraviolet light to decompose an amount of the dissolved ozone is disclosed. The method may include removing the dissolved carbon dioxide by controlling pH. The method may include removing the dissolved carbon dioxide by contact with a membrane degasifier. A system including a channel fluidly connectable to a source of an aqueous solution having dissolved carbon dioxide and dissolved ozone, a dissolved carbon dioxide removal subsystem, and a source of ultraviolet irradiation is also disclosed. The dissolved carbon dioxide removal subsystem may include a source of a pH adjuster. The dissolved carbon
(Continued)

dioxide removal subsystem may include a membrane degasifier.

23 Claims, 8 Drawing Sheets

(51) Int. Cl.
  *C02F 9/00* (2023.01)
  *C02F 1/20* (2023.01)
  *C02F 1/32* (2023.01)
  *C02F 1/66* (2023.01)
  *C02F 101/10* (2006.01)
  *C02F 103/34* (2006.01)

(52) U.S. Cl.
  CPC ............ *B01D 19/0073* (2013.01); *C02F 1/20* (2013.01); *C02F 1/32* (2013.01); *C02F 1/66* (2013.01); *C02F 2101/10* (2013.01); *C02F 2103/346* (2013.01); *C02F 2209/06* (2013.01); *C02F 2209/23* (2013.01); *C02F 2209/24* (2013.01); *C02F 2209/40* (2013.01)

(58) Field of Classification Search
  CPC .......... C02F 1/32; C02F 1/66; C02F 2101/10; C02F 2103/346; C02F 2201/326; C02F 2209/001; C02F 2209/003; C02F 2209/008; C02F 2209/02; C02F 2209/06; C02F 2209/23; C02F 2209/24; C02F 2209/40; C02F 2301/046; C02F 2303/18; C02F 9/00
  See application file for complete search history.

(56) References Cited

U.S. PATENT DOCUMENTS

| | | | |
|---|---|---|---|
| 6,991,733 B2 | 1/2006 | Kin et al. | |
| 2005/0263458 A1* | 12/2005 | Kin | C02F 9/00 210/664 |
| 2007/0144974 A1* | 6/2007 | Kin | C02F 1/469 210/663 |
| 2013/0220934 A1* | 8/2013 | Otani | C02F 1/32 210/748.14 |
| 2015/0377772 A1 | 12/2015 | Birks et al. | |
| 2016/0361693 A1 | 12/2016 | Hayashi et al. | |
| 2018/0362373 A1* | 12/2018 | Lee | B01D 39/2062 |
| 2019/0127253 A1* | 5/2019 | Thomas | E03B 3/28 |

FOREIGN PATENT DOCUMENTS

| | | |
|---|---|---|
| JP | H08197093 A | 8/1996 |
| JP | 2001113291 A | 4/2001 |
| JP | 2017074553 A | 4/2017 |
| WO | 1996036219 A1 | 11/1996 |

OTHER PUBLICATIONS

"The photolysis of ozone by ultraviolet radiation. II. The photolysis of ozone mixed with certain hydrogen-containing substances" R.G.W. Norrish and R.P. Wayne, Proceedings of the Royal Society of London. Series A, mathematical and physical sciences, vol. 288, No. 1414 (Nov. 16, 1965), pp. 361-370.

Batakliev et al. "Ozone Decomposition" Interdiscip Toxicol. Jun. 2014, 7(2): 47-59.

Gottschalk et al. "Electronics Fabrication with Dissolved O3: An Environmentally Friendly Solution." Ultrapure Water Journal. Jan./Feb. 2006: 33-38.

Eriksson "Ozone chemistry in aqueous solution—Ozone decomposition and stabilization." Licentiate Thesis. Department of Chemistry, Royal Institute of Technology 2005.

* cited by examiner

REMOVAL OF OZONE FROM PROCESS STREAMS WITH ULTRAVIOLET RADIATION

CROSS-REFERENCE TO RELATED APPLICATIONS

This application claims priority under 35 U.S.C. § 119(e) to U.S. Provisional Application Ser. No. 62/752,011, titled "Removal of Ozone from Process Streams with Ultraviolet Radiation and Caustic" filed Oct. 29, 2018, which is incorporated herein by reference in its entirety for all purposes.

FIELD OF TECHNOLOGY

Aspects and embodiments disclosed herein are generally related to water treatment systems and methods, and more specifically, to water treatment systems and methods for removal of ozone.

SUMMARY

In accordance with one aspect, there is provided a method comprising directing an aqueous solution having a first concentration of dissolved carbon dioxide and a first concentration of dissolved ozone into a vessel. The method may comprise removing an amount of the dissolved carbon dioxide from the aqueous solution to produce a first effluent having a second concentration of dissolved carbon dioxide lower than the first concentration of dissolved carbon dioxide. The method may comprise irradiating the first effluent with ultraviolet light at a dosage effective to decompose a predetermined amount of the dissolved ozone in the first effluent, to produce a second effluent having a second concentration of dissolved ozone lower than the first concentration of dissolved ozone.

In some embodiments, removing the amount of dissolved carbon dioxide may comprise controlling pH of the aqueous solution to a value effective to convert the amount of the dissolved carbon dioxide into at least one of carbonate and bicarbonate.

The method may comprise controlling the pH of the aqueous solution to be at least about 8. The method may comprise controlling the pH of the aqueous solution to be between about 8.3 and 11.

In some embodiments, the method may further comprise measuring at least one of pH of the aqueous solution and pH of the first effluent. The method may further comprise responsive to the measurement, adding a predetermined amount of an acid or a base to control the pH of the aqueous solution.

In some embodiments, the first effluent may be substantially free of dissolved carbon dioxide.

In certain embodiments, removing the amount of dissolved carbon dioxide may comprise contacting the aqueous solution with a membrane degasifier.

In some embodiments, the method may further comprise measuring at least one of a dissolved carbon dioxide concentration of the aqueous solution and a dissolved carbon dioxide concentration of the first effluent. The method may further comprise responsive to the measurement, controlling a removal rate of the dissolved carbon dioxide with the membrane degasifier. Controlling the removal rate may comprise at least one of adjusting a vacuum level of the membrane degasifier, adjusting sweep gas flow rate through the membrane degasifier, and controlling flow rate of the aqueous solution through the membrane degasifier.

The first concentration of dissolved carbon dioxide may be at least about 20 ppm.

The first concentration of dissolved ozone may be at least about 30 ppm.

The second concentration of dissolved ozone may be less than about 10 ppb.

The second concentration of dissolved ozone may be less than about 2 ppb.

The second concentration of dissolved ozone may be less than about 1 ppb.

The method may further comprise measuring at least one of the first concentration of dissolved ozone and the second concentration of dissolved ozone. The method may further comprise, responsive to the measurement, controlling at least one of the dosage of the ultraviolet irradiation and flow rate of at least one of the aqueous solution and the first effluent.

In some embodiments, the aqueous solution may comprise semiconductor manufacturing process water.

In accordance with another aspect, there is provided a system comprising a channel fluidly connectable to a source of an aqueous solution having a first concentration of dissolved carbon dioxide and a first concentration of dissolved ozone, the system may comprise a dissolved carbon dioxide removal subsystem fluidly connected to the channel and configured to remove an amount of the dissolved carbon dioxide from the aqueous solution to produce a first effluent. The system may comprise a source of ultraviolet irradiation positioned downstream from the dissolved carbon dioxide removal subsystem and configured to irradiate the first effluent to produce a second effluent.

In some embodiments, the dissolved carbon dioxide removal subsystem may comprise a source of a pH adjuster fluidly connected to the channel and configured to dose the aqueous solution with the pH adjuster to produce the first effluent.

The system may further comprise a mixer positioned downstream from the source of the pH adjuster and upstream from the source of the ultraviolet irradiation.

The system may further comprise a pH sensing subsystem comprising an inlet pH sensor configured to detect a pH of the aqueous solution and an outlet pH sensor configured to detect a pH of at least one of the first effluent and the second effluent. The pH sensing subsystem may be configured to output a pH signal indicative of a measurement obtained by at least one of the inlet pH sensor and the outlet pH sensor.

In some embodiments, the dissolved carbon dioxide removal subsystem may comprise a membrane degasifier fluidly connected to the channel.

The system may further comprise at least one of a vacuum pump and a source of a sweep gas associated with the membrane degasifier.

The system may further comprise a dissolved carbon dioxide sensing subsystem comprising an inlet dissolved carbon dioxide sensor configured to detect a dissolved carbon dioxide concentration of the aqueous solution and an outlet dissolved carbon dioxide sensor configured to detect a dissolved carbon dioxide of at least one of the first effluent and the second effluent. The dissolved carbon dioxide sensing subsystem may be configured to output a dissolved carbon dioxide signal indicative of a measurement obtained by at least one of the inlet dissolved carbon dioxide sensor and the outlet dissolved carbon dioxide sensor.

In accordance with certain embodiments, the system may comprise a flow meter configured to measure flow rate of at least one of the aqueous solution, the first effluent, and the second effluent. The flow meter may be configured to output a flow rate signal indicative of the measurement obtained by the flow meter.

The system may further comprise a controller a controller operably connected to the dissolved carbon dioxide removal subsystem and at least one of the pH sensing subsystem, the dissolved carbon dioxide sensing subsystem, and the flow meter. The controller may be configured to receive at least one of the pH signal, the dissolved carbon dioxide signal, and the flow rate signal, and to send a control signal to the dissolved carbon dioxide removal subsystem responsive to the received signal.

The controller may be configured to instruct the dissolved carbon dioxide removal subsystem to produce the first effluent being substantially free of dissolved carbon dioxide. The controller may be configured to send the control signal to the source of pH adjuster causing the source of pH adjuster to dose the aqueous solution with the pH adjuster responsive to the control signal.

The system may further comprise at least one dissolved ozone sensor positioned downstream from the source of the ultraviolet irradiation. The dissolved ozone sensor may be configured to measure a second concentration of dissolved ozone in the second effluent and output a dissolved ozone signal indicative of a measurement obtained by the dissolved ozone sensor.

The system may further comprise a controller operably connected to the at least one dissolved ozone sensor. The controller may be configured to receive the dissolved ozone signal and to send a control signal to at least one of the source of ultraviolet irradiation and a flow control device causing the source of the ultraviolet irradiation to irradiate the first effluent with ultraviolet light at a dosage effective to destroy a predetermined amount of the dissolved ozone in the first effluent responsive to the control signal.

The system may further comprise a controller operably connected to the at least one dissolved ozone sensor. The controller may be configured to receive the dissolved ozone signal and to send a control signal to the dissolved carbon dioxide removal subsystem causing the dissolved carbon dioxide removal subsystem to remove the amount of the dissolved carbon dioxide from the aqueous solution responsive to the control signal.

The dissolved carbon dioxide removal subsystem may comprise a source of a pH adjuster fluidly connected to the channel and configured to dose the aqueous solution with the pH adjuster to produce the first effluent. The controller may be configured to send the control signal to the source of the pH adjuster causing the source of pH adjuster to dose the aqueous solution with the pH adjuster responsive to the control signal.

In some embodiments, the source of the aqueous solution is associated with a semiconductor manufacturing system.

In accordance with another aspect, there is provided a method comprising directing an aqueous solution having a first concentration of dissolved carbon dioxide and a first concentration of dissolved ozone into a vessel, irradiating the aqueous solution with ultraviolet light at a dosage effective to decompose a predetermined amount of the dissolved ozone in the aqueous solution, to produce a first effluent, and removing an amount of the dissolved carbon dioxide from the first effluent to produce a second effluent having a second concentration of dissolved carbon dioxide lower than the first concentration of dissolved carbon dioxide and a second concentration of dissolved ozone lower than the first concentration of dissolved ozone.

In some embodiments, removing the amount of dissolved carbon dioxide may comprise controlling pH of the first effluent to a value effective to convert the amount of the dissolved carbon dioxide into at least one of carbonate and bicarbonate.

In some embodiments, removing the amount of dissolved carbon dioxide may comprise contacting the first effluent with a membrane degasifier.

In accordance with yet another aspect, there is provided a system comprising a channel fluidly connectable to a source of an aqueous solution having a first concentration of dissolved carbon dioxide and a first concentration of dissolved ozone, a source of ultraviolet irradiation fluidly connected to the channel and configured to irradiate the aqueous solution to produce a first effluent, and a dissolved carbon dioxide removal subsystem positioned downstream from the source of ultraviolet irradiation and configured to remove an amount of the dissolved carbon dioxide from the first effluent to produce a second effluent.

In some embodiments, the dissolved carbon dioxide removal subsystem may comprise a source of a pH adjuster fluidly connected to the channel and configured to dose the first effluent with the pH adjuster to produce the second effluent.

In some embodiments, the dissolved carbon dioxide removal subsystem comprises a membrane degasifier fluidly connected to the channel.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
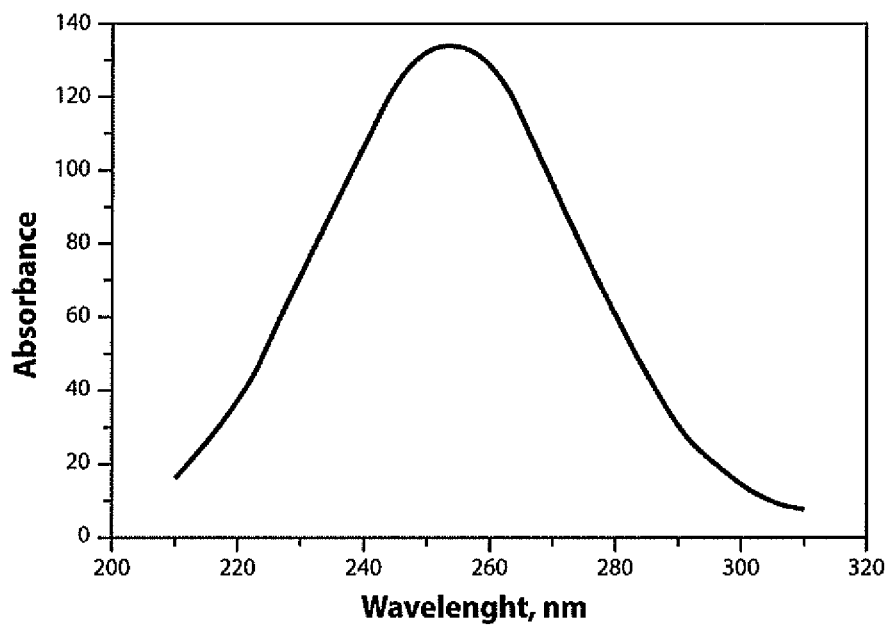
FIG. 1 is a graph of the ultraviolet absorption spectrum of ozone.

Process water such as semiconductor manufacturing process water often contains residual chemicals from one or more manufacturing steps. For example, in manufacturing semiconductor base materials, such as silicon wafers, chemicals may be used to add or remove layers of material, for cleaning, or for other purposes. The manufacturing method may include spinning the semiconductor articles within a processing chamber. Liquid and gas phase chemicals are often sprayed onto, or otherwise applied to, the semiconductor articles. After a period of time, the liquid processing chemicals may be drawn off, and the gases and/or vapors may be separately drawn or pumped out. Gases and/or vapors that meet environmental regulations may be vented out of the processing chamber.

Certain process steps involve ultrapure water containing ozone, oxygen, and/or carbon dioxide to clean semiconductor wafers. Ozone is a strong oxidizer, even at low concentrations. Dissolved ozone in the water may cause problems with other unit operations in semiconductor manufacturing systems, such as ion exchange resins and reverse osmosis membranes. Thus, this process stream is conventionally directed to a waste treatment facility.

In other manufacturing processes, ozone gas may be introduced into a processing chamber, occasionally in high concentrations, at intervals of between 5-20 seconds. The ozone and other gases, such as acid vapors, are conventionally removed from the processing chamber and exhausted into the atmosphere. However, ozone is a chemically reactive gas. At high concentrations, ozone gas can be toxic to humans. The exhaust gas including ozone and acid vapor can be toxic and highly corrosive. Consequently, handling the gas exhaust from a processing chamber may require special procedures. For example, components such as ducts and vents may comprise or be made of polypropylene or other corrosion resistant plastics and materials. Leak detectors may be employed to detect any leaks in the pipes or ducts carrying the exhaust gases. In accordance with certain methods, the exhaust gases may be scrubbed with water to form an aqueous solution containing dissolved ozone.

The systems and methods disclosed herein may be employed for onsite treatment of scrubbing or process waters containing dissolved ozone. In certain embodiments, the treated process water may be recirculated and reused at the facility, reducing the water demand of the facility. In other embodiments, the treated process water may be discharged. In general, the treated process water may meet environmental safety regulations for discharge.

In one particular embodiment, the source of the aqueous solution may be associated with a microelectronics manufacturing system or process. The source of the aqueous solution may be associated with a semiconductor manufacturing system or process. For instance, the aqueous solution may be a solution used for semiconductor chip or wafer manufacturing. As disclosed herein, semiconductor devices may include micro-processors, memory chips, and various other electronic devices typically manufactured from silicon or gallium arsenide wafers. Semiconductor devices manufactured from other appropriate materials are within the scope of the disclosure. Electronic products including semiconductor devices include flat panel displays, rigid disk memories, thin film head device substrates, compact disk substrates, and others.

The source of the aqueous solution may comprise water with at least about 20 ppb of total ionic impurities. In certain instances, the disclosure may refer to semiconductor manufacturing systems. However, it should be noted that the systems and methods disclosed herein may similarly be employed in association with any aqueous solution including dissolved ozone and dissolved carbon dioxide. For example, the source of the aqueous solution may be associated with a water purification, nuclear power generation, microelectronics manufacturing, semiconductor manufacturing, food processing, textile manufacturing, paper manufacturing and recycling, pharmaceutical manufacturing, chemical processing, and metal extraction system or process. The source of the aqueous solution may be associated with industrial applications, for example, with the removal of recalcitrant organic contaminants from industrial wastewaters. The source of the aqueous solution may be associated with wastewater and/or municipal water treatment. The source of the aqueous solution may be associated with an activated sludge water treatment system or method. In general, the aqueous solution may be associated with systems or methods which contact water with ozone and carbon dioxide.

The systems and methods disclosed herein may comprise directing the aqueous solution into a vessel. The vessel may be any structure employed to house the aqueous solution. For instance, the vessel may be or include a channel, a container, a receptacle, a holder, a reactor, or any conduit usable for the methods disclosed herein.

One method of destroying dissolved ozone in an aqueous solution includes irradiating the solution with ultraviolet light. Briefly, under appropriate conditions, ultraviolet energy decomposes one of the oxygen bonds in an ozone molecule. Thus, ultraviolet irradiation may catalyze the destruction of ozone into oxygen and water. The ultraviolet irradiation effective to decompose ozone may have a wavelength as shown in the graph of FIG. 1. FIG. 1 is a graph of the ultraviolet absorption spectrum of ozone. The ultraviolet irradiation effective to decompose ozone may have a wavelength between 200-280 nm. In particular embodiments, the ultraviolet irradiation effective to decompose ozone may have a wavelength of about 254 nm.

The dosage of ultraviolet irradiation may be selected to decompose a predetermined amount of the dissolved ozone in the aqueous solution. The dosage may be controlled by controlling ultraviolet light irradiation, volume or area of aqueous solution exposed, and period of time of exposure. For a fixed volume vessel, dosage may be controlled by controlling ultraviolet light irradiation or flow rate of the aqueous solution through a source of ultraviolet irradiation. Ultraviolet dosage ($\mu Ws/cm^2$) is equivalent to ultraviolet intensity (W/cm) times exposure time (seconds).

In some embodiments, the aqueous solution may comprise at least 20 ppm, at least 25 ppm, at least 30 ppm, at least 40 ppm, or at least 50 ppm dissolved ozone. The methods may comprise controlling the dosage of ultraviolet irradiation to produce an irradiated effluent having less than about 25 ppb, less than about 20 ppb, less than about 15 ppb, less than about 10 ppb, less than about 5 ppb, less than about 2 ppb, or less than about 1 ppb dissolved ozone. Thus, the systems and methods disclosed herein may be configured to irradiate the aqueous solution with ultraviolet light at a dosage effective to decompose at least 90%, at least 95%, at least 99%, at least 99.9%, or at least 99.99% of the dissolved ozone in the aqueous solution.

The methods disclosed herein may comprise measuring a concentration of dissolved ozone in the aqueous solution or the irradiated effluent. The dosage of ultraviolet irradiation may be controlled responsive to the measurement. For example, the dosage or intensity of ultraviolet irradiation may be increased responsive to a measurement of dissolved ozone in the aqueous solution greater than an inlet threshold. The inlet threshold may be, for example, 20 ppm, 25 ppm, or 30 ppm. The dosage or intensity of ultraviolet irradiation may be increased responsive to a measurement of dissolved ozone in the irradiated effluent greater than a target threshold. The target threshold may be, for example, 2 ppb, 5 ppb, or 10 ppb. In some embodiments, the flow rate of the aqueous solution may be controlled responsive to the dissolved ozone measurement. For example, the flow rate of the aqueous solution may be decreased responsive to the measurement of dissolved ozone in the aqueous solution or irradiated effluent being greater than the inlet or target threshold.

The method may include recirculating an amount of irradiated effluent to a point upstream from the ultraviolet irradiation step. In particular, the method may include recirculating an amount of irradiated effluent having a dissolved ozone concentration greater than the target threshold. In some embodiments, the methods may comprise recirculating an amount of irradiated effluent responsive to the measurement of dissolved ozone in the irradiated effluent being out of tolerance of the target range. For instance, the methods may comprise recirculating an amount of irradiated effluent having a dissolved ozone concentration which is more than 10%, more than 25%, or more than 30% greater than the target threshold.

In some embodiments, the aqueous solution may comprise dissolved carbon dioxide. While not wishing to be bound by theory, carbon dioxide may interfere with the removal of dissolved ozone by ultraviolet irradiation. Briefly, ultraviolet irradiation photochemically decomposes ozone by the following reactions:

$$O_3 + O \rightarrow O_2 + O_2$$

$$O_3 + h\nu \rightarrow O_2 + O(^3P)$$

$$O_3 + h\nu \rightarrow O_2 + O(^1D)$$

The above reactions lead to the formation of oxygen atoms in ground and excited states. In water, ultraviolet irradiation may additionally generate hydroxyl radicals. The hydroxyl radicals generally react with ozone to form oxygen and water by the following reaction:

$$OH\bullet + O_3 \rightarrow O_2 + HO_2\bullet$$

When dissolved carbon dioxide is present, the carbon dioxide may react with hydroxyl radicals, inhibiting the decomposition of ozone by the same radicals.

Thus, the systems and methods disclosed herein may comprise removing an amount of dissolved carbon dioxide from the aqueous solution to produce an effluent having a lower is concentration of dissolved carbon dioxide. The lower concentration of dissolved carbon dioxide may generally be the concentration sufficient to allow decomposition of the dissolved ozone by irradiation with ultraviolet light, without substantial interference in the reaction. The systems and methods may then comprise irradiating the effluent with ultraviolet light, as previously described.

The above described reactions generally occur at a slow rate. Thus, in accordance with other embodiments, the systems and methods may comprise irradiating the aqueous solution with ultraviolet light prior to removal of the dissolved carbon dioxide. The dissolved carbon dioxide may then be removed to inhibit substantial interference with the ozone destruction reaction. The dissolved carbon dioxide may be removed immediately following the irradiation with ultraviolet light. In particular, the systems and methods may comprise removing the dissolved carbon dioxide before a substantial amount of the dissolved carbon dioxide interferes with the ozone destruction reaction. Thus, the methods may comprise removing the dissolved carbon dioxide seconds after irradiating with the ultraviolet light (for example, less than 30 seconds, less than 10 seconds, less than 5 seconds, less than 2 seconds, or less than 1 second after irradiating with the ultraviolet light).

In accordance with certain methods, dissolved carbon dioxide may be removed by controlling pH of the aqueous solution. For instance, the method may comprise controlling pH to a value effective to convert dissolved carbon dioxide into at least one of carbonate and bicarbonate. Dissolved carbon dioxide is generally in equilibrium with carbonic acid ($H_2CO_3$), following the equation:

$$CO_2 + H_2O \rightleftharpoons H_2CO_3$$

Figure 2:
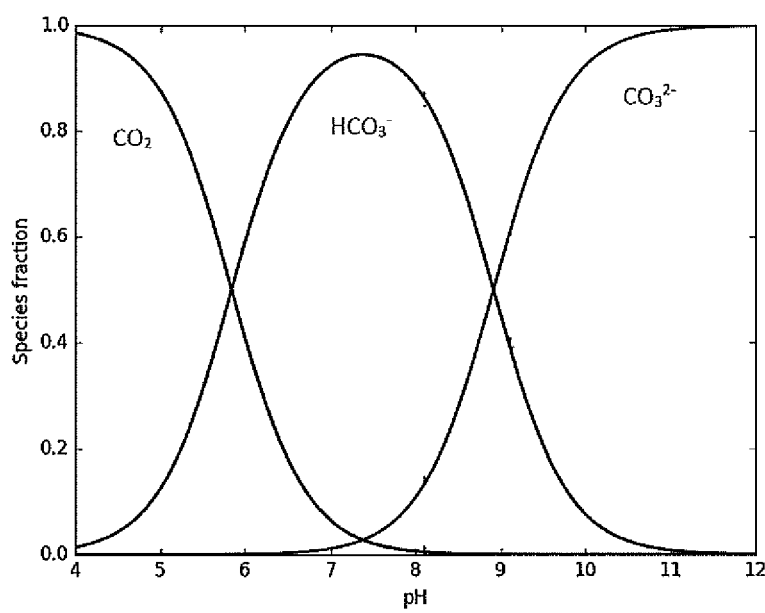
FIG. 2 is a graph of the fractional amount of aqueous carbon dioxide, bicarbonate, and carbonate by varying pH value.

The relative concentrations of carbon dioxide, carbonic acid, and deprotonated forms bicarbonate ($HCO_3^-$) and carbonate ($CO_3^{2-}$) depend on pH of the solution. Dissolved carbon dioxide can be removed from the solution by controlling pH to a value effective to shift the equilibrium in favor of bicarbonate and carbonate. FIG. 2 is a graph of the fractional amount of aqueous carbon dioxide, bicarbonate, and carbonate by varying pH value. The systems and methods may comprise controlling pH to a value effective to shift the species fraction of dissolved carbon dioxide to be less than 0.2, less than 0.15, less than 0.10, less than 0.05, or less than 0.01.

In accordance with certain embodiments, the systems and methods disclosed herein may control pH to be greater than 7, greater than 7.5, or greater than 8. The systems and methods disclosed herein may control pH to be greater than or about 8.3, between about 8.3 and 11, at least about 9, or between about 9 and 11. Thus, the systems and methods disclosed herein may control pH to produce an effluent having less than a 0.2, less than a 0.15, less than a 0.10, less than a 0.05, or less than a 0.01 fractional value of dissolved carbon dioxide.

The systems and methods disclosed herein may comprise controlling pH by addition of an acid or a base. Exemplary strong acids include hydrochloric acid (HCl), nitric acid ($HNO_3$), hydroiodic acid (HI), perchloric acid ($HClO_4$), and chloric acid ($HClO_3$). Exemplary weak acids include sulfurous acid ($H_2SO_3$), methanoic acid ($HCO_2H$), phosphoric acid ($H_3PO_4$), nitrous acid ($HNO_2$), hydrofluoric acid (HF), and conjugate acids of bases described below. Exemplary strong bases that may be added include sodium hydroxide (NaOH), potassium hydroxide (KOH), barium hydroxide ($Ba(OH)_2$), cesium hydroxide (CsOH), strontium hydroxide ($Sr(OH)_2$), calcium hydroxide ($Ca(OH)_2$), lithium hydroxide (LiOH), and rubidium hydroxide (RbOH). Exemplary weak bases that may be added include ammonia ($NH_3$), trimethyl ammonia (N(CH$_3$)$_3$), pyridine (C$_5$H$_5$N), ammonium hydroxide (NH$_4$OH), and conjugate bases of acids described above.

The methods may comprise mixing the acid or base with the aqueous solution. In some embodiments, the acid or base may be mixed with the aqueous solution to produce a substantially homogeneous pH-controlled effluent.

In other embodiments, the systems and methods disclosed herein may comprise removing the amount of dissolved carbon dioxide from the aqueous solution by contacting the solution with a membrane degasifier. Briefly, membrane degasifiers remove dissolved gases from solution upon contact with a hollow fiber membrane. In general, the membrane degasifier may operate in association with a vacuum pump and a sweep gas. The sweep gas may be any inert gas. In certain embodiments, the sweep gas may be nitrogen. One exemplary membrane degasifier effective at removing dissolved carbon dioxide is the Liqui-Cel™ membrane degasifier (distributed by 3M™ Company, Maplewood, MN).

The method may further comprise measuring a dissolved carbon dioxide concentration in the aqueous solution or effluent. Responsive to the measurement, the method may comprise controlling a removal rate of the dissolved carbon dioxide with the membrane degasifier. Rate of removal of the dissolved carbon dioxide may be controlled by adjusting vacuum level of the membrane degasification. For example, by adjusting speed of the vacuum pump or adjusting a vacuum relief valve set point. Rate of removal of the dissolved carbon dioxide may be controlled by adjusting the sweep gas flow rate through the membrane degasifier. In other embodiments, rate of removal of the dissolved carbon dioxide may be controlled by adjusting flow rate of the aqueous solution through the membrane degasifier.

In certain embodiments, the aqueous solution may comprise at least about 10 ppm, at least about 15 ppm, at least about 20 ppm, at least about 25 ppm, at least about 30 ppm, at least about 40 ppm, or at least about 50 ppm dissolved carbon dioxide. The dissolved carbon dioxide may be in the form of carbonic acid in equilibrium. The methods may comprise removing dissolved carbon dioxide to produce an effluent having less than about 25 ppb, less than about 20 ppb, less than about 15 ppb, less than about 10 ppb, less than about 5 ppb, less than about 2 ppb, or less than about 1 ppb dissolved carbon dioxide. Thus, the systems and methods disclosed herein may be configured to remove at least 90%, at least 95%, at least 99%, at least 99.9%, or at least 99.99% of the dissolved carbon dioxide in the aqueous solution. In some embodiments, the methods may comprise producing an effluent which is substantially free of dissolved carbon dioxide.

The methods may further comprise measuring a concentration of dissolved carbon dioxide in the aqueous solution or effluent. The rate of removal of the dissolved carbon dioxide may be controlled responsive to the measurement. For example, addition of a pH adjuster or flow rate through the membrane degasifier may be controlled responsive to the measurement. Methods may include recirculating an amount of effluent or irradiated effluent comprising more dissolved carbon dioxide than a threshold amount. For instance, effluent or irradiated effluent having greater than a 0.2, 0.4, or 0.6 species fraction of dissolved carbon dioxide may be recirculated for further treatment.

In particular embodiments, the methods may comprise measuring pH of the aqueous solution or effluent. Thus, addition of a pH adjuster may be controlled responsive to the measurement of pH. For instance, the methods may comprise adding a predetermined amount of an acid or a base to control pH responsive to the pH measurement.

The methods may further comprise controlling a dosage of ultraviolet irradiation responsive to the measurement of dissolved carbon dioxide or pH of the aqueous solution or the effluent. In particular embodiments, dosage of ultraviolet irradiation may be increased responsive to the dissolved carbon dioxide being greater than a threshold amount or the pH being lower than a threshold amount. Thus, ultraviolet light intensity may be increased or flow rate may be decreased responsive to the measurement of dissolved carbon dioxide or pH in the aqueous solution or effluent.

In some embodiments, the methods may comprise measuring temperature of the aqueous solution or an effluent. Temperature may have an effect on the solubility of carbon dioxide in the aqueous solution and the equilibrium between dissolved carbon dioxide and carbonic acid. Briefly, carbon dioxide is more soluble at lower temperatures. Thus, removal of the dissolved carbon dioxide may be controlled responsive to a temperature measurement of the aqueous solution or effluent.

The methods may further comprise measuring flow rate of the aqueous solution or an effluent. As previously described, flow rate may have an effect on ultraviolet irradiation dosage. Thus, ultraviolet dosage may be controlled responsive to a flow rate measurement. For example, ultraviolet intensity may be increased responsive to a greater flow rate measurement (for example, greater than a threshold value). Ultraviolet intensity may be decreased responsive to a lower flow rate measurement (for example, lower than a threshold value). Additionally, flow rate may have an effect on removal of dissolved carbon dioxide from the aqueous solution. For instance, dosage of the pH adjuster may be controlled responsive to a flow rate measurement by administering a greater volume of pH adjuster responsive to a greater flow rate measurement or administering lower volume of pH adjuster responsive to a lower flow rate measurement. For a fixed volume membrane degasifier, flow rate may have an effect on removal of dissolved carbon dioxide. In particular, flow rate may be controlled responsive to a dissolved carbon dioxide concentration in the aqueous solution.

Figure 3A:
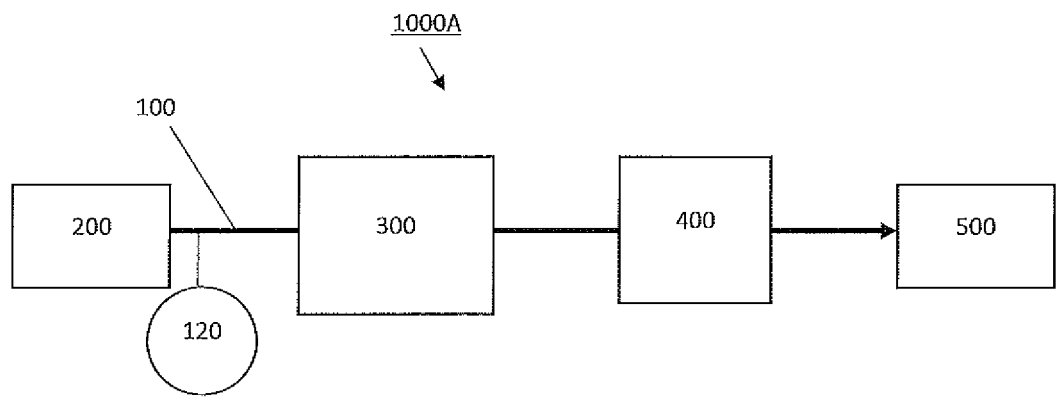
FIG. 3A is a box diagram of a system for removal of dissolved ozone from an aqueous solution comprising dissolved carbon dioxide, according to one embodiment.
Figure 3B:
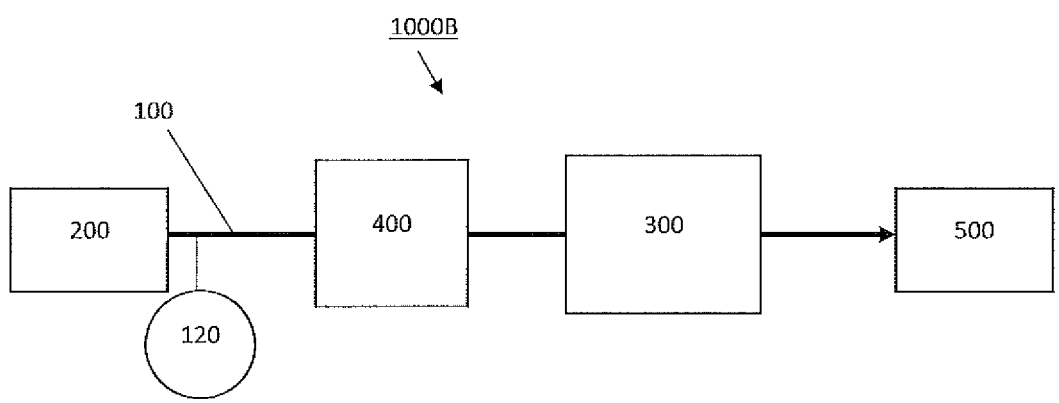
FIG. 3B is a box diagram of an alternate system for removal of dissolved ozone from an aqueous solution comprising dissolved carbon dioxide, according to one embodiment.

In accordance with certain aspects, there is provided a system capable of performing the methods disclosed herein. An exemplary system 1000 for decomposition of dissolved ozone in an aqueous solution is shown in FIGS. 3A-3B, as systems 1000A and 1000B, respectively. The system 1000 may generally include a channel 100 fluidly connectable to a source of the aqueous solution 200, a dissolved carbon dioxide removal subsystem 300 fluidly connected to the channel 100 and configured to remove an amount of the dissolved carbon dioxide, and a source of ultraviolet irradiation 400 configured to irradiate the effluent, as previously described. In system 1000A, the source of ultraviolet irradiation 400 is positioned downstream from the dissolved carbon dioxide removal subsystem 300. In system 1000B, the source of ultraviolet irradiation 400 is positioned upstream from the dissolved carbon dioxide removal subsystem 300. System 1000 may include a flow control device, such as pump 120, configured to control flow rate of the aqueous solution 200 through the channel 100. In other embodiments, the flow control device may comprise a flow control valve. The flow control valve may be configured to control flow rate of the aqueous solution 200 through the channel 100.

The source of the aqueous solution 200 may comprise treated water, desalinated water, filtered water, purified water, distilled water, deionized water, demineralized, or high purity water. High purity water includes water with very low trace contaminants, other than the dissolved carbon dioxide and dissolved ozone as previously described. The trace contaminants may be measured in the low parts per billion (ppb) or parts per trillion (ppt) concentration range. The trace contaminants may include volatile organic carbon, inorganic ions, organic compounds, bacteria and other microbiological species, endotoxins and nucleases, particulates, and gases. Examples of high purity water include ultrapure water and water of grades 1-3 as established by the International Organization for Standardization (ISO) or types I-IV as established by ASTM International. In some specific non-limiting embodiments, ultrapure water has a resistivity of about 18.18 MD/cm at 25° C.

The channel 100 may be constructed or lined with a material resistant to oxidation and/or corrosion. For instance, the channel 100 may be constructed or lined with a material comprising a polyolefin (polyethylene, polypropylene, high density polyethylene (HDPE), low density polyethylene (LDPE), ultra high molecular weight polymers (UHMW), polypropylene (PP)), polyvinyl chloride (PVC), chlorinated polyvinyl chloride (CPVC), or a fluoroplastic or fluoropolymer (polytetrafluoroethylene (PTFE), fluorinated ethylene propylene (FEP), perfluoroalkoxy alkanes (PFA), polyvinylidene difluoride (PVDF), polychlorotrifluoroethylene (PCTFE), ethylene chlorotrifluoroethylene (ECTFE), ethylene tetrafluoroethylene (ETFE), and others).

The channel may be fluidly connectable to a point of use 500. In certain embodiments, the source of the aqueous solution 200 is a semiconductor manufacturing system. In such embodiments, the point of use 500 may be associated with the semiconductor manufacturing system, such that treated aqueous solution may be reused by an on-site unit operation. The source of the aqueous solution 200 and/or the point of use 500 may be associated with one or more of water purification, nuclear power generation, microelectronics manufacturing, semiconductor manufacturing, food processing, textile manufacturing, paper manufacturing and recycling, pharmaceutical manufacturing, chemical processing, and metal extraction system or process. The source of the aqueous solution 200 and/or the point of use 500 may be associated with one or more of an industrial application, a wastewater and/or municipal water treatment application, and an activated sludge application.

In some embodiments, the system 1000 may be fluidly connectable to a post-treatment system upstream from the point of use 500. For instance, the system 1000 may be fluidly connectable to one or mom of a membrane filter system, a carbon filter system, an ion exchange system (including a cation exchange bed, an anion exchange bed, and/or a mixed bed), an ultrafiltration system, and a reverse osmosis system. The post-treatment may be selected based on the target point of use 500 for the irradiated effluent.

In yet other embodiments, the treated aqueous solution may meet environmental discharge requirements. Thus, the point of use 500 may be an industrial or municipal drainage.

The source of ultraviolet irradiation 400 may be configured to irradiate the aqueous solution with ultraviolet light at a dosage effective to decompose a predetermined amount of the dissolved ozone, as previously described. The source of ultraviolet irradiation 400 may comprise an ultraviolet lamp configured to irradiate the solution with UVC light having a wavelength between 100 nm and 280 nm. In some embodiments, the source of ultraviolet irradiation 400 may be configured to irradiate the solution with light having a wavelength between 200 nm and 280 nm, for instance, about 254 nm.

The source of ultraviolet irradiation 400 may be configured to irradiate the solution with ultraviolet light at an intensity of between about 1000 mJ/cm$^2$ and 3000 mJ/cm$^2$. For example, the source of ultraviolet irradiation 400 may be configured to irradiate the solution with ultraviolet light at an intensity of about 1000 mJ/cm$^2$, about 1500 mJ/cm$^2$, about 2000 mJ/cm$^2$, about 2500 mJ/cm$^2$, 3000 mJ/cm$^2$. The source of ultraviolet irradiation 400 may be configured to irradiate the solution with ultraviolet light at variable intensities. In some embodiments, as previously described, the source of ultraviolet irradiation 400 may be configured to irradiate the solution with ultraviolet light at an intensity responsive to a measured dissolved ozone concentration.

The dissolved carbon dioxide removal subsystem 300 may be configured to remove an amount of the dissolved carbon dioxide from the aqueous solution to produce an effluent having a concentration of dissolved carbon dioxide lower than the aqueous solution. In some embodiments, the dissolved carbon dioxide removal subsystem 300 may comprise a source of a pH adjuster fluidly connected to the channel 100. The source of the pH adjuster may be, for example, a source of an acid or a base as previously described. The dissolved carbon dioxide removal subsystem 300 may further comprise a mixer positioned downstream from the source of the pH adjuster and configured to mix the aqueous solution with the pH adjuster. The mixer may be a static mixer or any structure or device able to mix the pH adjuster into the fluid. In particular, the mixer may be a structure or device configured to produce a substantially homogeneous mixture.

The carbon dioxide removal subsystem 300 may comprise a metering pump configured to direct a predetermined amount of the pH adjuster to the channel 100. The metering pump may be configured to direct the pH adjuster to the channel 100 at variable flow rates. In some embodiments, as previously described, the metering pump may be configured to direct the pH adjuster to the aqueous solution flowing through the channel 100 in a concentration selected to control pH of the solution. For example, the metering pump may be configured to direct the pH adjuster to the aqueous solution at a concentration selected responsive to a measured dissolved ozone concentration of pH of a solution.

In certain embodiments, the dissolved carbon dioxide removal subsystem 300 may comprise a membrane degasifier fluidly connected to the channel. The membrane degasifier may be any membrane degasifier configured to remove dissolved carbon dioxide. In some embodiments, the membrane degasifier may comprise media in the form of random packing media or fixed media on a membrane. The media may comprise polypropylene, polyvinylidene fluoride (PVDF), or any other media suitable for removal of dissolved carbon dioxide from an aqueous solution. The membrane degasifier may be a gravity flow membrane degasifier. The dissolved carbon dioxide removal subsystem 300 may further comprise a vacuum pump for operation of the membrane degasifier. The membrane degasifier may be associated with a source of a sweep gas. The source of the sweep gas may be an inert gas, for example, nitrogen.

The pump 120 may be configured to direct the aqueous solution 200 through the channel 100 and control flow rate of the aqueous solution 200. In some embodiments, the flow rate may be controlled to be between 100 gal/min and 800 gal/min. For example, the flow rate may be controlled to be between 200 gal/min and 600 gal/min. The flow rate may be controlled to be about 200 gal/min, about 300 gal/min, about 350 gal/min, about 400 gal/min, about 450 gal/min, about 500 gal/min, or about 600 gal/min. The pump 120 may be configured to direct the aqueous solution 200 at variable flow rates. In some embodiments, as previously described, the pump 120 may be configured to direct the aqueous solution 200 through the channel 100 at a flow rate selected to control dosage of ultraviolet irradiation to the solution, responsive to a measured dissolved ozone concentration.

Figure 4:
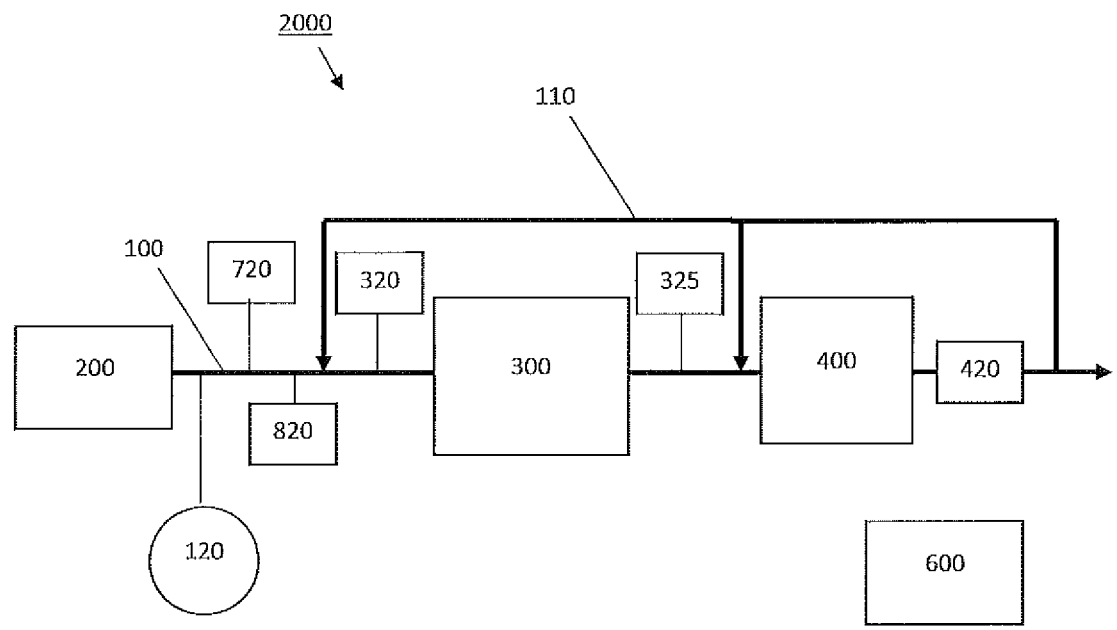
FIG. 4 is a box diagram of an alternate system for removal of dissolved ozone from an aqueous solution comprising dissolved carbon dioxide, according to one embodiment.

Exemplary system 2000 for decomposition of dissolved ozone in an aqueous solution is shown in FIG. 4. System 2000 includes the components of system 100, and further includes a dissolved carbon dioxide sensing subsystem comprising an inlet dissolved carbon dioxide sensor 320 and an outlet dissolved carbon dioxide sensor 325 configured to detect the concentration of dissolved carbon dioxide in at least one of the aqueous solution 200 and the effluent downstream from the dissolved carbon dioxide removal subsystem 300. In particular embodiments, the dissolved carbon dioxide sensing subsystem may be a pH sensing subsystem, including inlet pH sensor 320 and outlet pH sensor 325, configured to measure pH of the solution or effluent.

System 2000 includes a dissolved ozone sensor 420 positioned downstream from the source of the ultraviolet irradiation 400 configured to measure concentration of dissolved ozone in the irradiated effluent. The system may comprise more than one dissolved ozone sensor, for example, at least two dissolved ozone sensors positioned downstream from the source of the ultraviolet irradiation 400. In some embodiments, the system may comprise an inlet dissolved ozone sensor configured to measure dissolved ozone concentration in the aqueous solution 200.

System 2000 includes a flow meter 720. The flow meter 720 may be configured to measure a flow rate of a solution moving through the channel 100. System 2000 includes a temperature sensor 820. The temperature sensor 820 may be configured to measure temperature of a solution moving through the channel 100.

System 2000 further includes controller 600 operably connected to the dissolved carbon dioxide removal subsystem 300, source of the ultraviolet irradiation 400, and pump 120. The controller 600 may be configured to provide a control signal to the dissolved carbon dioxide removal subsystem 300, source of the ultraviolet irradiation 400, and pump 120. It is noted that an exemplary system may include one or more sensor and not be operated by a controller. Additionally, a system may include a controller operably connected to one or two of the dissolved carbon dioxide removal subsystem 300, source of the ultraviolet irradiation 400, and pump 120.

At least one of the inlet dissolved carbon dioxide sensor 320 and the outlet dissolved carbon dioxide sensor 325 may be configured to output a dissolved carbon dioxide signal indicative of a measurement obtained by the respective dissolved carbon dioxide sensor. The dissolved carbon dioxide signal may be displayed on a display device. The dissolved carbon dioxide signal may be transmitted to a user. In some embodiments, the dissolved carbon dioxide signal may trigger an alert to inform a user that a measured dissolved carbon dioxide value has exceeded a predetermined threshold. The dissolved carbon dioxide signal may be transmitted to the controller 600.

In accordance with certain embodiments in which the dissolved carbon dioxide sensors are pH sensors, at least one of the inlet pH sensor 320 and the outlet pH sensor 325 may be configured to output a pH signal indicative of a measurement obtained by the respective pH sensor. The pH signal may be displayed on a display device. The pH signal may be transmitted to a user. In some embodiments, the pH signal may trigger an alert to inform a user that a measured pH value has exceeded a predetermined threshold. The pH signal may be transmitted to the controller 600.

The dissolved ozone sensor 420 may be configured to output a dissolved ozone signal indicative of a measurement obtained by the dissolved ozone sensor 420. The dissolved ozone signal may be displayed on a display device. The dissolved ozone signal may be transmitted to a user. In some embodiments, the dissolved ozone signal may trigger an alert to inform a user that a measured dissolved ozone value has exceeded a predetermined threshold. The dissolved ozone signal may be transmitted to the controller 600.

The flow meter 720 may be configured to output a flow rate signal indicative of a measurement obtained by the flow meter 720. The temperature sensor 820 may be configured to output a temperature signal indicative of a measurement obtained by the temperature sensor 820. One or more of the flow rate signal and the temperature signal may be displayed on a display device. One or more of the temperature signal and the flow rate signal may be transmitted to a user. In some embodiments, the temperature signal and/or the flow rate signal may trigger an alert to inform a user that a measured value has exceeded a predetermined threshold. The temperature signal and/or the flow rate signal may be transmitted to the controller 600.

The controller 600 may be operably connected to one or more of the dissolved carbon dioxide sensing subsystem (320, 325) (which may include pH sensing subsystem, the dissolved ozone sensor 420, the flow meter 720, and the temperature sensor 820. The system may be configured to receive an input signal from one or more of the dissolved carbon dioxide sensing subsystem, the dissolved ozone sensor 420, the flow meter 720, and the temperature sensor 820. The controller 600 may be configured to generate the control signal responsive to the input signal. Thus, the controller 600 may be configured to control operation of one or more unit operation of the system 2000, as previously described herein.

In some embodiments, the controller 600 may be configured to instruct the dissolved carbon dioxide removal subsystem 300 to remove a predetermined amount of dissolved carbon dioxide from the aqueous solution. For example, the controller 600 may be configured to instruct the dissolved carbon dioxide removal subsystem 300 to produce an effluent being substantially free of dissolved carbon dioxide. In some embodiments, the controller may be configured to send the control signal to the source of the pH adjuster causing the source of the pH adjuster to dose the aqueous solution with the pH adjuster responsive to the signal (for example, the pH signal). The controller 600 may be configured to adjust the pH of the aqueous solution to be between 8.0 and 11, or a pH as previously described.

In some embodiments, the controller 600 may be configured to send the control signal to at least one of the source of the ultraviolet irradiation 400, the pump 120, and the dissolved carbon dioxide removal subsystem 300. For example, the controller 600 may be configured to cause the source of the ultraviolet irradiation 400 to irradiate the solution with ultraviolet light at a dosage effective to destroy a predetermined amount of the dissolved ozone in the solution, responsive to the signal (for example, dissolved ozone signal). The controller 600 may instruct the source of ultraviolet irradiation 400 to adjust the ultraviolet light intensity or instruct the pump 120 to adjust the flow rate responsive to the dissolved ozone signal.

Additionally, the controller 600 may be configured to cause the dissolved carbon dioxide removal subsystem 300 to remove a predetermined amount of dissolved carbon dioxide responsive to the dissolved ozone signal. For example, the controller 600 may be configured to operate the membrane degasifier (by adjusting the vacuum pump or sweep gas flow rate) responsive to the dissolved ozone signal, or the controller 600 may instruct the source of the pH adjuster to dose the aqueous solution 200 with an amount of pH adjuster responsive to the dissolved ozone signal.

The controller 600 may be a computer or mobile device. The controller 600 may comprise a touch pad or other operating interface. For example, the controller 600 may be operated through a keyboard, touch screen, track pad, and/or mouse. The controller 600 may comprise one or more output device, for example, a display or speaker. To generate the control signal, the controller 600 may comprise a system processor coupled to a memory device storing data from at least one input value. The memory device may be an internal memory device, an external memory device, or a cloud-based memory device. The controller 600 may be configured to run software on an operating system known to one of ordinary skill in the art.

The controller 600 may be electrically connected to a power source. The controller 600 may be digitally connected to one or more unit operation, as disclosed herein. The controller 600 may be connected to the unit operation through a wireless connection. For example, the controller 600 may be connected to the unit operation through wireless local area networking (WLAN) or short-wavelength ultra-high frequency (UHF) radio waves. The controller 600 may further be operably connected to any pump or valve within the system, for example, to enable the controller 600 to direct solutions within the system as needed.

System 2000 further includes recycle line 110 extending from a point downstream of the source of the ultraviolet irradiation 400 to a point upstream from the source of the ultraviolet irradiation 400 and a point upstream from the dissolved carbon dioxide removal subsystem 300. The controller 600 may be configured to direct effluent through the recycle line 110 responsive to the dissolved ozone signal. For example, the controller 600 may be configured to direct effluent having a concentration of dissolved ozone greater than a threshold concentration to a point upstream in the dissolved ozone removal system 2000. The controller 600 may be configured to direct the effluent through actuation of one or more valves (not shown) operably connected to the controller.

The system may comprise one or more additional valves, pumps, or channels configured to control direction of the aqueous solution or an effluent through the system, as described herein.

EXAMPLES

The function and advantages of these and other embodiments can be better understood from the following examples. These examples are intended to be illustrative in nature and are not considered to be limiting the scope of the invention.

Example 1: Sodium Hydroxide and Ultraviolet Irradiation

Figure 5:
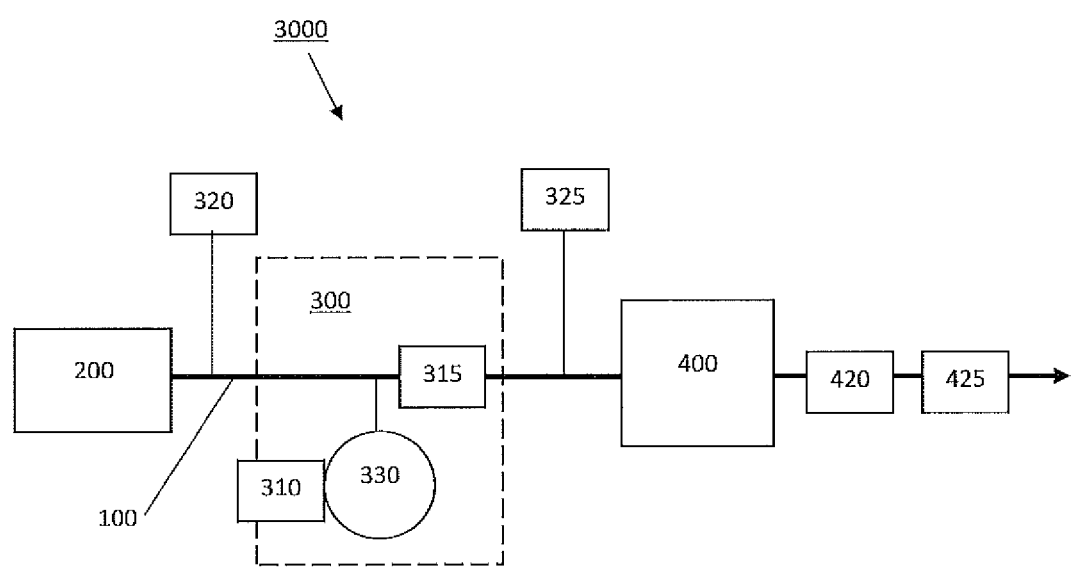
FIG. 5 is a box diagram of an alternate system for removal of dissolved ozone from an aqueous solution comprising dissolved carbon dioxide, according to one embodiment.

An experimental system 3000 as shown in FIG. 5 was used to treat ultrapure water having 26 ppm of dissolved carbon dioxide and 30 ppm of dissolved ozone. The aqueous solution 200 was directed through channel 100 at a flow rate of about 2 gal/min. The aqueous solution 200 had an initial pH of 4.7.

Dissolved carbon dioxide removal subsystem 300 included a source of sodium hydroxide 310 as the pH adjuster and a static mixer 315 positioned downstream from the source of sodium hydroxide 310. Metering pump 330 was configured to introduce the sodium hydroxide into the channel 100. The system included an inlet pH sensor 320 and an outlet pH sensor 325 positioned downstream from the dissolved carbon dioxide removal subsystem 300.

The source of ultraviolet irradiation 400 was an ultraviolet lamp set to apply ultraviolet light having a wavelength of 254 nm at an intensity of 2000 mJ/cm$^2$. The system included first dissolved oxygen sensor 420 and second dissolved oxygen sensor 425 positioned downstream from the source of ultraviolet irradiation 400.

Figure 6:
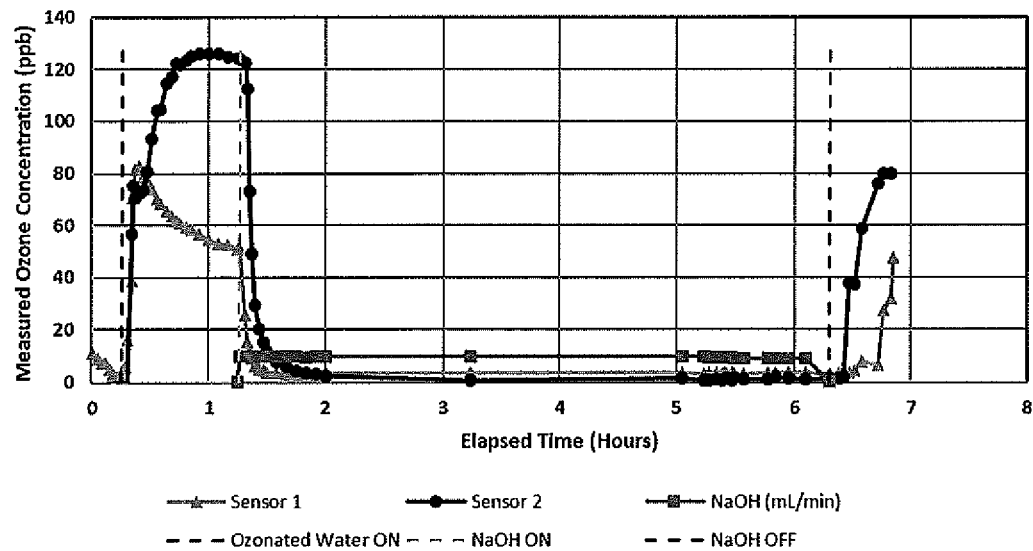
FIG. 6 is a graph of dissolved ozone concentration over time, according to operation of one embodiment.
Figure 7:
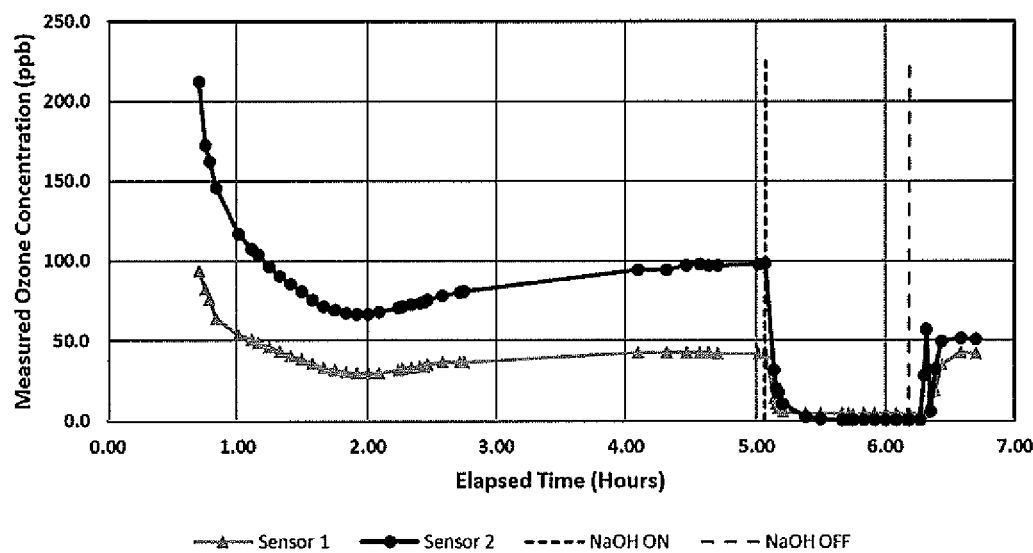
FIG. 7 is a graph of dissolved ozone concentration over time, according to operation of another embodiment.

The measured dissolved ozone concentrations are presented in the graphs of FIGS. 6-7. Briefly, FIG. 6 is a graph of dissolved ozone concentration (ppb) in the effluent over time (hours), as measured by two dissolved ozone sensors. Initially, ultraviolet irradiation was activated but the dissolved ozone concentration peaked at about 120 ppb. Shortly after one hour, NaOH was continuously administered to the solution at a concentration of about 10 ppb. The dissolved ozone concentration fell to below 10 ppb. Shortly after 6 hours, NaOH was stopped. The dissolved ozone concentration increased to about 80 ppb.

FIG. 7 is a graph of dissolved ozone concentration (ppb) in the effluent over time (hours), as measured by two dissolved ozone sensors. The initial dissolved ozone concentration was measured at about 100 ppb by one sensor and greater than 200 ppb by another sensor. Over a period of 5 hours, the dissolved ozone concentration measurements stabilized at 50 ppb and 100 ppb, as measured by the two sensors, respectively. Shortly after 5 hours, 3% NaOH was continuously administered to the solution. The dissolved ozone concentration fell to below about 2 ppb.

Thus, removal of dissolved carbon dioxide increases destruction of dissolved ozone by ultraviolet irradiation. The pH adjuster and ultraviolet irradiation have a synergistic effect in the removal of the dissolved ozone. The systems and methods described herein may be employed to reduce dissolved ozone concentration in an aqueous solution to 2 ppb or less.

The system 3000 of FIG. 5 may be scaled up to a commercially acceptable capacity. For example, system 3000 can be scaled up to treat 400 gal/min of aqueous solution.

Example 2: Ultraviolet Irradiation

An experimental system similar to system 3000, but without the dissolved carbon dioxide removal subsystem 300 and pH sensors 320, 325, was used to treat feed water having an initial concentration of dissolved ozone of 30 ppm, a concentration of dissolved oxygen of 50 ppm, and a concentration of dissolved carbon dioxide of 26 ppm. The feed water was directed through the channel 100 at a flow rate of between 150-300 L/hr and temperature of 25° C. After 2.45 hours of directing the feed water through the channel 100, ultraviolet light was applied.

Figure 8A:
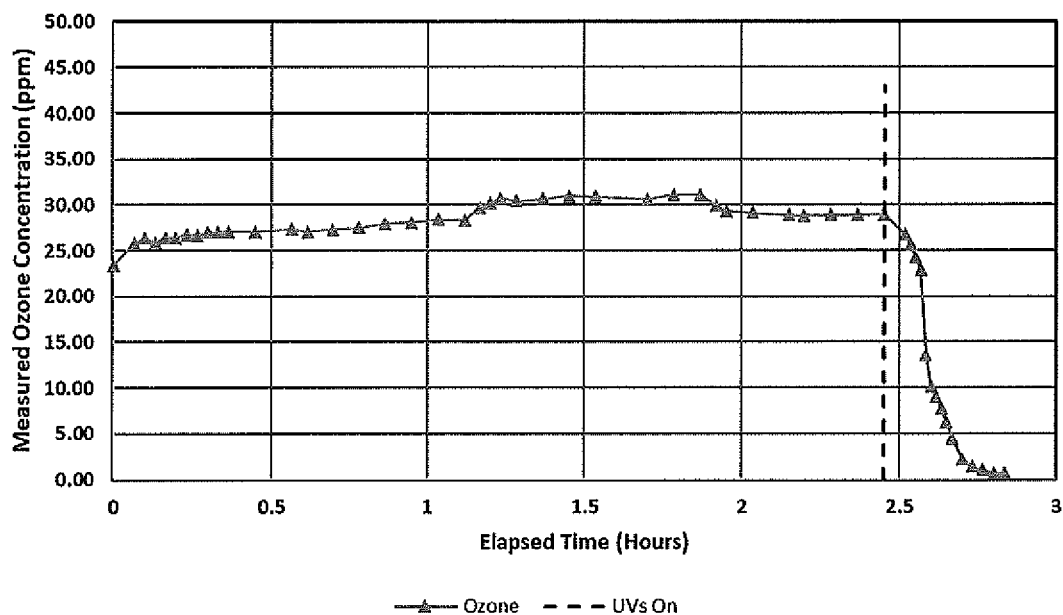
FIG. 8A is a graph of dissolved ozone concentration over time, according to operation of another embodiment.
Figure 8B:
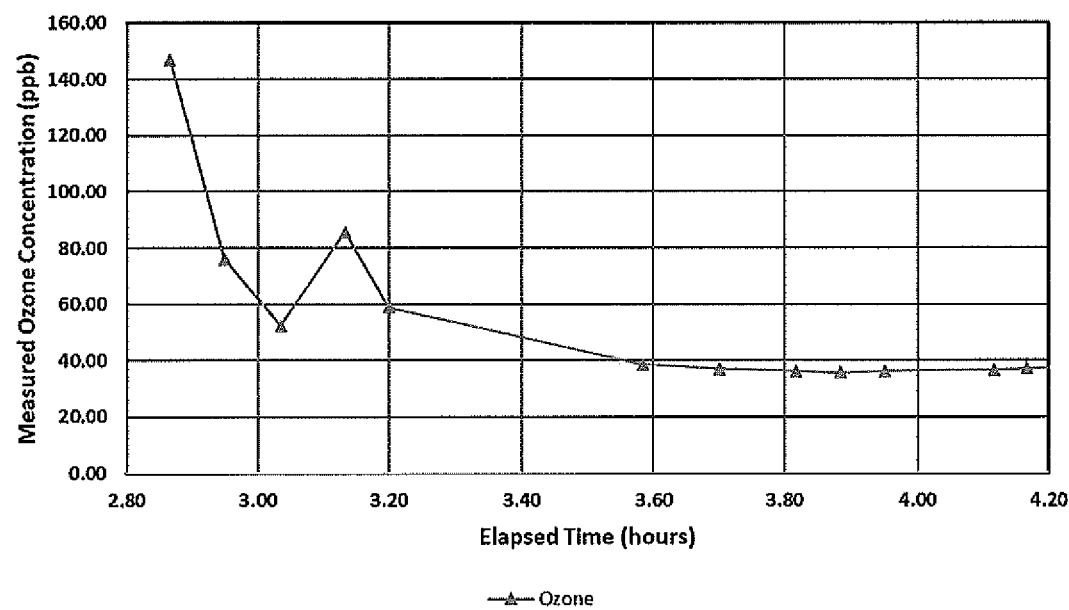
FIG. 8B is a graph of dissolved ozone concentration over time, according to operation of another embodiment.

The results are presented in the graphs of FIGS. 8A-8B. FIG. 8B is a continuation of FIG. 8A with a different scale y-axis for clarity. As shown in the graph of FIG. 8A, irradiation with ultraviolet light reduced dissolved ozone concentration from 30 ppm to less than 1 ppm. As shown in the graph of FIG. 8B, irradiation with ultraviolet light ultimately reduced the dissolved ozone concentration to 35 ppb. Thus, ultraviolet irradiation can reduce dissolved ozone concentration to 35 ppb.

Example 3: Ultraviolet Irradiation Upstream from Sodium Hydroxide

An experimental system similar to system 3000, but with the source of ultraviolet light 400 positioned upstream from the dissolved carbon dioxide removal subsystem 300, was used to treat feed water having an initial concentration of dissolved ozone of 30 ppm, a concentration of dissolved oxygen of 50 ppm, and a concentration of dissolved carbon dioxide of 26 ppm. The feed water was directed through the channel 100 at a flow rate of about 300 L/hr and temperature of 25° C. Ultraviolet light was applied. After 1.3 hours of directing the feed water through the channel 100, sodium hydroxide addition was initiated. The pH of the effluent was 7.9. After 6.3 hours of directing the feed water through the channel 100, sodium hydroxide addition was terminated.

Figure 9:
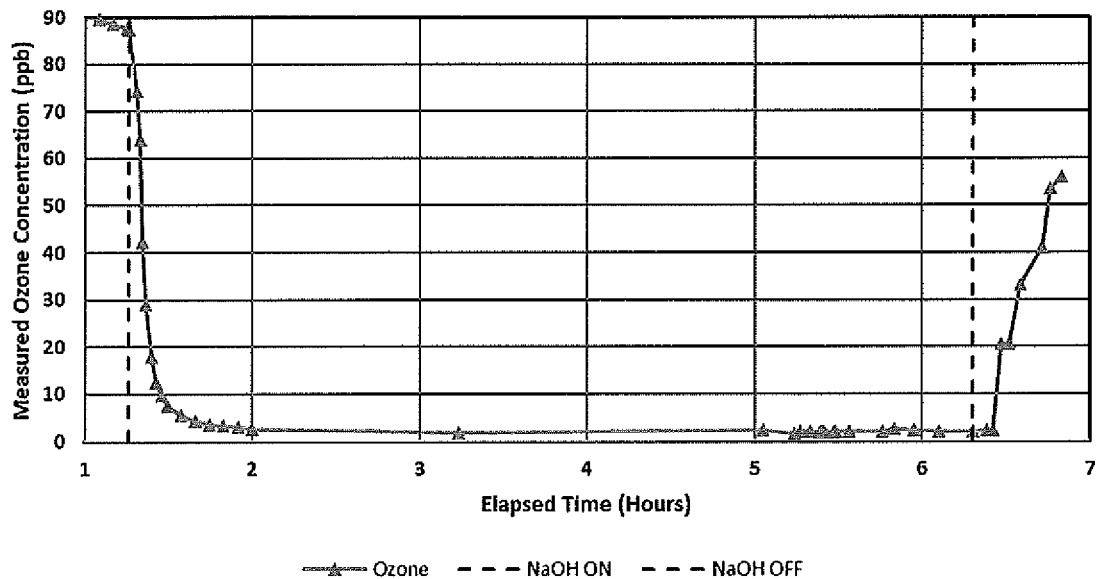
FIG. 9 is a graph of dissolved ozone concentration over time, according to operation of another embodiment.

The results are presented in the graph of FIG. 9. As shown in the graph of FIG. 9, dissolved ozone concentration declined from 90 ppb to 2.1 ppb after addition of sodium hydroxide was initiated. Furthermore, dissolved ozone concentration began to rise, as expected, after addition of sodium hydroxide was terminated. Thus, ultraviolet irradiation and pH increase can reduce dissolved ozone to 2.1 ppb.

Example 4: Sodium Hydroxide Upstream from Ultraviolet Irradiation

An experimental system similar to system 3000 was used to treat feed water having an initial concentration of dissolved ozone of 30 ppm, a concentration of dissolved oxygen of 50 ppm, and a concentration of dissolved carbon dioxide of 26 ppm. The feed water was directed through the channel 100 at a flow rate of between about 150-270 L/hr and temperature of 25° C. Ultrapure water was initially run through the system with ultraviolet light being applied. Sodium hydroxide was administered to stabilize pH of the water.

After 2.25 hours of directing the ultrapure water through the channel 100, the feed water was introduced into the system and ultrapure water was stopped. The pH of the effluent was between 9-11. After 4 hours of directing the feed water through the channel 100, sodium hydroxide concentration was reduced. At the lower concentration of sodium hydroxide, the dissolved ozone concentration in the effluent was not changed.

Figure 10:
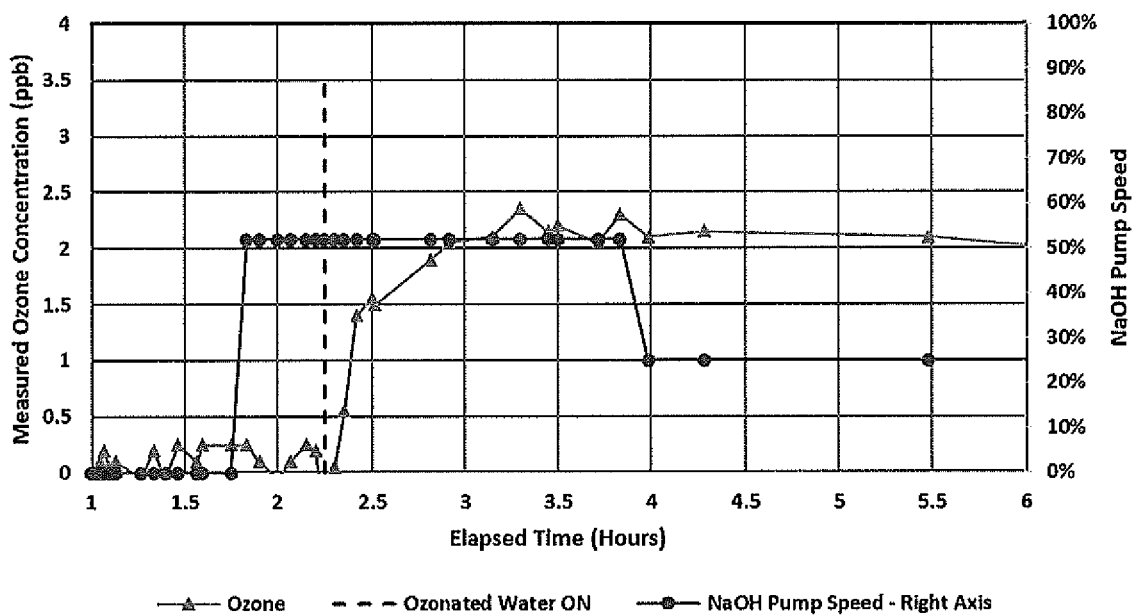
FIG. 10 is a graph of dissolved ozone concentration and sodium hydroxide pump speed over time, according to operation of one embodiment.

The results are presented in the graph of FIG. 10. As shown in the graph of FIG. 10, dissolved ozone concentration remained stable at around 2 ppb during addition of sodium hydroxide at a metering pump 330 speed of 50% and at a metering pump 330 speed of 25%. Thus, decreasing dosage of sodium hydroxide at the tested values did not have an effect on dissolved ozone concentration in the effluent.

Example 5: Sodium Hydroxide

An experimental system similar to system 3000, but without the source of ultraviolet light 400, was used to treat feed water having an initial concentration of dissolved ozone of 30 ppm, a concentration of dissolved oxygen of 50 ppm, and a concentration of dissolved carbon dioxide of 26 ppm. The feed water was directed through the channel 100 at a flow rate of about 150 L/hr and temperature of 25° C. Ultrapure water was initially run through the system with ultraviolet light being applied. Sodium hydroxide was administered to stabilize pH of the water.

After 0.5 hours of directing the ultrapure water through the channel 100, the feed water was introduced into the system and ultrapure water was stopped. The pH of the effluent was between 9-11. After 1.3 hours of directing the feed water through the channel 100, sodium hydroxide concentration was reduced. After 3 hours of directing the feed water through the channel 100, sodium hydroxide concentration was increased. At the lower concentration of sodium hydroxide, the dissolved ozone concentration in the effluent increased. After resuming the higher concentration of sodium hydroxide, the dissolved ozone concentration in the effluent decreased.

Figure 11:
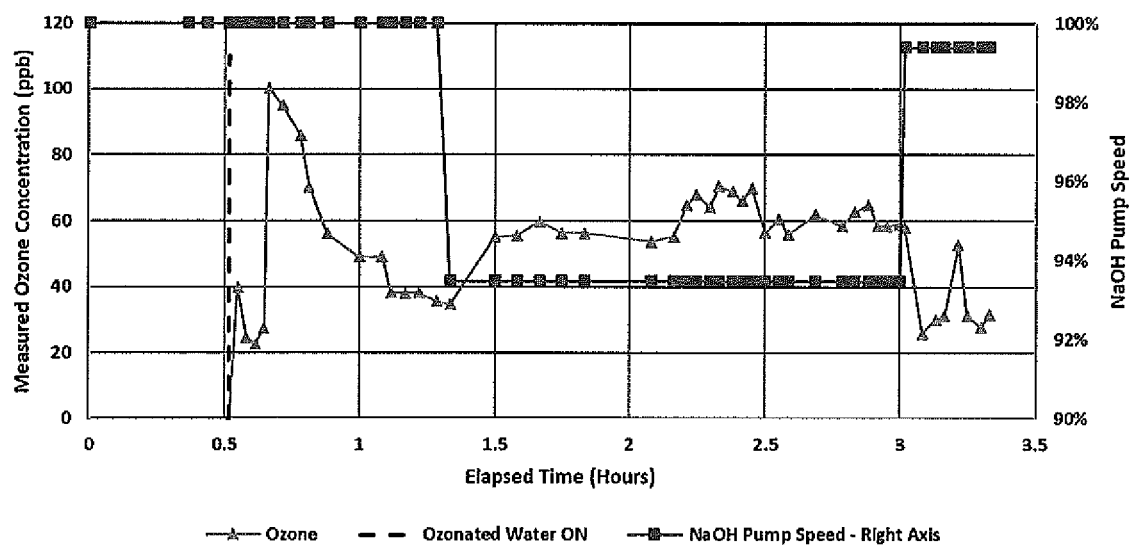
FIG. 11 is a graph of dissolved ozone concentration and sodium hydroxide pump speed over time, according to operation of another embodiment.

The results are presented in the graph of FIG. 11. As shown in the graph of FIG. 11, dissolved ozone concentration varied widely. Dissolved ozone concentration initially decreased to less than about 35 ppb at a metering pump 330 speed of 100%. Dissolved ozone concentration increased to between about 50 and 70 ppb at a metering pump 330 speed of 93%. Dissolved ozone concentration again decreased to about 25 ppb (with a spike at about 50 ppb) at a metering pump 330 speed of 99%. Thus, decreasing dosage of sodium hydroxide at the tested values did have an effect on dissolved ozone concentration in the effluent when ultraviolet light is not applied.

Example 6: Membrane Degasification and Ultraviolet Irradiation

An experimental system similar to system 3000, but with a membrane degasifier and vacuum pump as the dissolved carbon dioxide removal subsystem 300, was used to treat feed water having an initial concentration of dissolved ozone of 30 ppm, a concentration of dissolved oxygen of 50 ppm, and a concentration of dissolved carbon dioxide of 26 ppm. The experimental system included an additional source of ultraviolet irradiation 400 upstream from the membrane degasifier. The feed water was directed through the channel 100 at a flow rate of between about 240-300 L/hr and temperature of 25° C. The pH of the feed water was 9. Ultrapure water was initially run through the system with ultraviolet light being applied.

After 0.75 hours of directing the ultrapure water through the channel 100, the feed water was introduced into the system and ultrapure water was stopped.

Figure 12A:
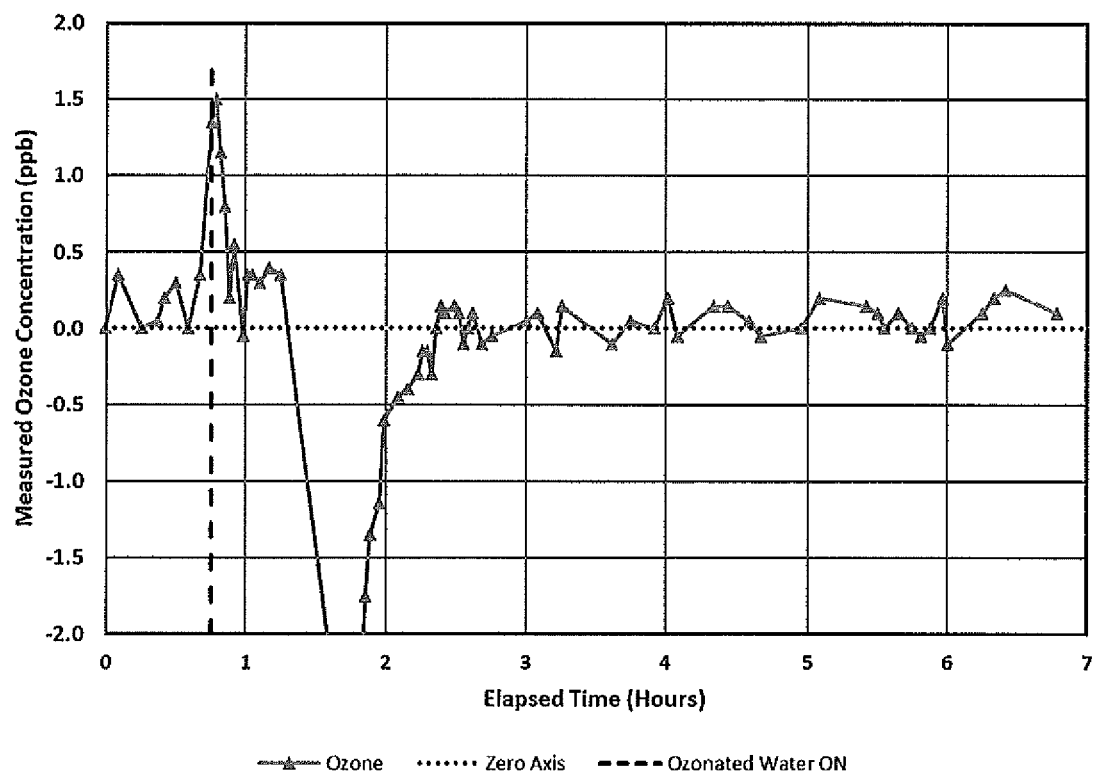
FIG. 12A is a graph of dissolved ozone concentration over time, according to operation of another embodiment.

The results are presented in the graph of FIG. 12A. As shown in the graph of FIG. 12A, dissolved ozone concentration measurement remained stable at around less than 0.25 ppb. However, it is noted that the dissolved ozone sensor 420 had a lower detection limit of 0.4 ppb. Thus, the results of the experimental setup are unclear. However, removal of dissolved carbon dioxide with a membrane degasifier was effective at greatly reducing the concentration of dissolved ozone in the effluent.

Example 7: Membrane Degasification, Ultraviolet Irradiation, and Sodium Hydroxide An experimental system similar to the system of example 6, but with a source of sodium hydroxide 310, metering pump 330, and static mixer 315 positioned downstream from the second source of ultraviolet irradiation 400, was used to treat feed water having an initial concentration of dissolved ozone of 30 ppm, a concentration of dissolved oxygen of 50 ppm, and a concentration of dissolved carbon dioxide of 26 ppm. The experimental system included an additional source of ultraviolet irradiation 400 upstream from the membrane degasifier. The feed water was directed through the channel 100 at a flow rate of between about 240-300 L/hr and temperature of 25° C. The pH of the feed water was 9. Ultrapure water was initially run through the system with ultraviolet light being applied.

After 0.8 hours of directing the ultrapure water through the channel 100, the feed water was introduced into the system and ultrapure water was stopped. After 3.7 hours of directing the feed water through the channel 100, the second source of ultraviolet irradiation 400 was stopped. After 4.9 hours of directing the feed water through the channel 100, sodium hydroxide was administered. After 6.4 hours of directing the feed water though the channel 100, sodium hydroxide was terminated.

Figure 12B:
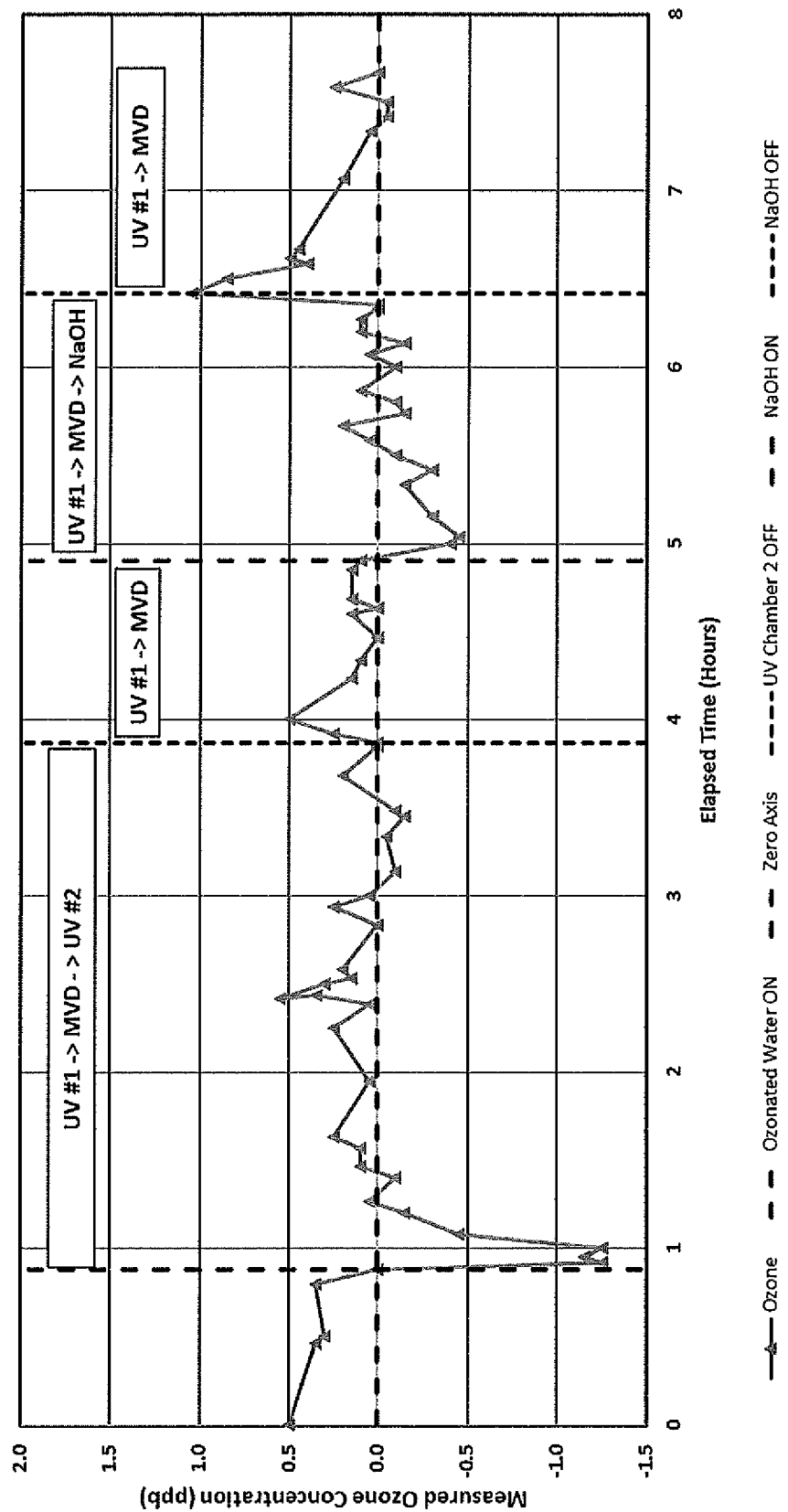
FIG. 12B is a graph of dissolved ozone concentration over time, according to operation of another embodiment.

The results are presented in the graph of FIG. 12B. As shown in the graph of FIG. 12B, the dissolved ozone concentration generally ranged between 1 ppb and 0. As previously noted, the dissolved ozone sensor 420 has a lower detection limit of 0.4 ppb. Shutting-off of the second source of ultraviolet irradiation 400 had no effect on the dissolved ozone concentration in the effluent. The addition of sodium hydroxide had little to no effect on the dissolved ozone concentration in the effluent. Finally, termination of the sodium hydroxide had little to no effect on the dissolved ozone concentration in the effluent. Removal of dissolved carbon dioxide with a membrane degasifier and two sources of ultraviolet irradiation or addition of sodium hydroxide has no increased benefit over removal of the dissolved ozone with a membrane degasifier and a single source of ultraviolet irradiation.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method comprising:
   directing an aqueous solution having a first concentration of dissolved carbon dioxide and a first concentration of dissolved ozone into a vessel;
   removing an amount of the dissolved carbon dioxide from the aqueous solution to produce a first effluent having a second concentration of dissolved carbon dioxide lower than the first concentration of dissolved carbon dioxide; and
   irradiating the first effluent with ultraviolet light at a dosage effective to decompose a predetermined amount of the dissolved ozone in the first effluent, to produce a second effluent having a second concentration of dissolved ozone lower than the first concentration of dissolved ozone.

2. The method of claim 1, wherein removing the amount of dissolved carbon dioxide comprises controlling pH of the aqueous solution to a value effective to convert the amount of the dissolved carbon dioxide into at least one of carbonate and bicarbonate.

3. The method of claim 2, comprising controlling the pH of the aqueous solution to be at least about 8.

4. The method of claim 3, comprising controlling the pH of the aqueous solution to be between about 8.3 and 11.

5. The method of claim 2, further comprising measuring at least one of the pH of the aqueous solution and a pH of the first effluent, and
   responsive to the measurement, adding a predetermined amount of an acid or a base to control the pH of the aqueous solution.

6. The method of claim 1, wherein the first effluent is substantially free of dissolved carbon dioxide.

7. The method of claim 1, wherein removing the amount of dissolved carbon dioxide comprises contacting the aqueous solution with a membrane degasifier.

8. The method of claim 7, further comprising measuring at least one of a dissolved carbon dioxide concentration in the aqueous solution and a dissolved carbon dioxide concentration in the first effluent, and
   responsive to the measurement, controlling a removal rate of the amount of dissolved carbon dioxide with the membrane degasifier by at least one of adjusting a vacuum level of the membrane degasifier, adjusting sweep gas flow rate through the membrane degasifier, and controlling flow rate of the aqueous solution through the membrane degasifier.

9. The method of claim 1, wherein the first concentration of dissolved carbon dioxide is at least about 20 ppm.

10. The method of claim 1, wherein the first concentration of dissolved ozone is at least about 30 ppm.

11. The method of claim 10, wherein the second concentration of dissolved ozone is less than about 10 ppb.

12. The method of claim 11, wherein the second concentration of dissolved ozone is less than about 2 ppb.

13. The method of claim 12, wherein the second concentration of dissolved ozone is less than about 1 ppb.

14. The method of claim 1, further comprising measuring at least one of the first concentration of dissolved ozone and the second concentration of dissolved ozone, and responsive to the measurement, controlling at least one of the dosage of the ultraviolet irradiation and flow rate of at least one of the aqueous solution and the first effluent.

15. The method of claim 1, wherein the aqueous solution comprises semiconductor manufacturing process water.

16. A system comprising: a channel fluidly connected to a source of an aqueous solution having a first concentration of dissolved carbon dioxide and a first concentration of dissolved ozone; a dissolved carbon dioxide removal subsystem fluidly connected to the channel and configured to remove an amount of the dissolved carbon dioxide from the aqueous solution to produce a first effluent; and a source of ultraviolet irradiation positioned downstream from the dissolved carbon dioxide removal subsystem and configured to irradiate the first effluent to produce a second effluent.

17. The system of claim 16, wherein the dissolved carbon dioxide removal subsystem comprises a source of a pH adjuster fluidly connected to the channel and configured to dose the aqueous solution with the pH adjuster to produce the first effluent.

18. The system of claim 17, further comprising a mixer positioned downstream from the source of the pH adjuster and upstream from the source of the ultraviolet irradiation.

19. The system of claim 17, further comprising a pH sensing subsystem comprising an inlet pH sensor configured to detect a pH of the aqueous solution and an outlet pH sensor configured to detect a pH of at least one of the first effluent and the second effluent, the pH sensing subsystem configured to output a pH signal indicative of a measurement obtained by at least one of the inlet pH sensor and the outlet pH sensor.

20. The system of claim 16, wherein the dissolved carbon dioxide removal subsystem comprises a membrane degasifier fluidly connected to the channel.

21. The system of claim 20, wherein the dissolved carbon dioxide removal subsystem comprises at least one of a vacuum pump and a source of a sweep gas associated with the membrane degasifier.

22. The system of claim 20, further comprising a dissolved carbon dioxide sensing subsystem comprising an inlet dissolved carbon dioxide sensor configured to detect a dissolved carbon dioxide concentration of the aqueous solution and an outlet dissolved carbon dioxide sensor configured to detect a dissolved carbon dioxide of at least one of the first effluent and the second effluent, the dissolved carbon dioxide sensing subsystem configured to output a dissolved carbon dioxide signal indicative of a measurement obtained by at least one of the inlet dissolved carbon dioxide sensor and the outlet dissolved carbon dioxide sensor.

23. The system of claim 16, further comprising a flow meter configured to measure flow rate of at least one of the aqueous solution, the first effluent, and the second effluent, and configured to output a flow rate signal indicative of the measurement obtained by the flow meter.

* * * * *